US011036589B1

(12) United States Patent
Panikkar et al.

(10) Patent No.: US 11,036,589 B1
(45) Date of Patent: Jun. 15, 2021

(54) INTELLIGENT REQUEST CONTROL FOR REST SERVICE

(71) Applicant: EMC IP Holding Company LLC, Hopkinton, MA (US)

(72) Inventors: Shibi Panikkar, Bangalore (IN); Murali Devendranath, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 6 days.

(21) Appl. No.: 16/751,536

(22) Filed: Jan. 24, 2020

(51) Int. Cl.
*G06F 11/07* (2006.01)
*G06F 11/14* (2006.01)
*G06F 9/54* (2006.01)

(52) U.S. Cl.
CPC ......... *G06F 11/1443* (2013.01); *G06F 9/541* (2013.01); *G06F 2201/805* (2013.01)

(58) Field of Classification Search
CPC .................................................. G06F 11/1443
USPC ........................................................ 714/16, 18
See application file for complete search history.

(56) References Cited

U.S. PATENT DOCUMENTS

| 10,560,372 | B1* | 2/2020 | Lucas | H04L 47/125 |
|---|---|---|---|---|
| 2012/0254269 | A1* | 10/2012 | Carmichael | G06F 16/13 |
| | | | | 707/827 |
| 2016/0127254 | A1* | 5/2016 | Kumar | H04L 41/0803 |
| | | | | 709/226 |
| 2017/0063989 | A1* | 3/2017 | Langouev | G06F 9/5083 |
| 2020/0351392 | A1* | 11/2020 | Bomma | H04L 67/2833 |

OTHER PUBLICATIONS

Wikipedia, "Representational State Transfer," https://en.wikipedia.org/w/index.php?title=Representational_state_transfer&oldid=936472708, Jan. 19, 2020, 7 pages.

\* cited by examiner

*Primary Examiner* — Chae M Ko
(74) *Attorney, Agent, or Firm* — Ryan, Mason & Lewis, LLP (57) ABSTRACT

Techniques for intelligent service request control in an information processing system are provided. For example, a method comprises the following steps. In response to a failure of a request sent to a given service, data relating to one or more previous requests sent to the given service is analyzed. A recovery recommendation is generated based on the analyzing step and one or more factors, the recovery recommendation comprising a retry methodology to resend the request to the given service.

20 Claims, 9 Drawing Sheets

| 22-Jul | | | 23-Jul | | |
|---|---|---|---|---|---|
| | | Retry Count | | | Retry Count |
| 10 to 11 | Request 1 | 10002 | 4 | 10 to 11 | Request 1 | 10000003 | 7 |
| | Request 2 | 10000002 | 6 | | Request 2 | 10002 | 4 |
| | Request 3 | 100000003 | 7 | | Request 3 | 100002 | 5 |
| | Request 4 | 10002 | 4 | | Request 4 | 10002 | 4 |
| | Request 5 | 100000003 | 7 | | Request 5 | 10002 | 4 |
| | Request 6 | 100002 | 5 | | Request 6 | 10000003 | 7 |
| | | | | | Request 7 | 10002 | 4 |

| 11 to 12 | Request 1 | 10002 | 3 | 11 to 12 | Request 1 | 10002 | 4 |
| | Request 2 | 1000002 | 4 | | Request 2 | 1002 | 4 |
| | Request 3 | 10002 | 3 | | Request 3 | 100002 | 5 |
| | Request 4 | 1000002 | 3 | | Request 4 | 1000002 | 3 |
| | Request 5 | 1000002 | 5 | | Request 5 | 1002 | 4 |
| | Request 6 | 100002 | 4 | | Request 6 | 10002 | 4 |
| | | | | | Request 7 | 10002 | 4 |
| | | | | | Request 8 | | |

| 20 to 21 | Request 1 | 12 | 1 | 20 to 21 | Request 1 | 102 | 2 |
| | Request 2 | 102 | 2 | | Request 2 | 12 | 1 |
| | Request 3 | 12 | 1 | | Request 3 | 12 | 1 |
| | Request 4 | 12 | 1 | | Request 4 | 12 | 1 |
| | Request 5 | 12 | 2 | | Request 5 | 12 | 1 |
| | Request 6 | 12 | 1 | | Request 6 | 12 | 1 |
| | | | | | Request 7 | 12 | 1 |

| 6 to 7 | Request 1 | null | 0 |
| | Request 2 | null | 0 |
| | Request 3 | null | 0 |
| | Request 4 | null | 0 |
| | Request 5 | null | 0 |

10 to 11

| First Iteration | | | | Second Iteration | | | | Third Iteration | | | |
|---|---|---|---|---|---|---|---|---|---|---|---|
| Algorithm | Setting | Max Retry count | Result | Algorithm | Setting | Max Retry count | Result | Algorithm | Setting | Max Retry count | Result |
| Increase Retry delay Average Retry Count * Min. Retry Count > 1 | Retry Delay = 8 Secs | 5 | Retry Count Reduced to 2, Number of Exceptions 6 | Increase Retry delay Average Retry Count * Min. Retry Count > 1 | Retry Delay = 10 Secs | 5 | Retry Count Reduced to 0, Number of Exceptions: 0 | Decrease Retry delay by 250 ms | Retry Delay = 9.75 Secs | 0 | Retry Count Reduced to 0, Number of Exceptions: 0 |

11 to 12

| First Iteration | | | | Second Iteration | | | | Third Iteration | | | |
|---|---|---|---|---|---|---|---|---|---|---|---|
| Algorithm | Setting | Max Retry count | Result | Algorithm | Setting | Max Retry count | Result | Algorithm | Setting | Max Retry count | Result |
| Increase Retry delay Average Retry Count * Min. Retry Count > 1 | 2.6666666667 | 5 | Retry Count Reduced to 2, Number of Exceptions 0 | Min retry count is 1. So increase the delay by 1/4 | 3.3333333333 | 5 | Retry Count Reduced to 0, Number of Exceptions 0 | Decrease Retry delay by 250 ms | 3.083333333 | 0 | Retry Count Reduced to 0, Number of Exceptions: 0 |

6 to 7

| First Iteration | | | |
|---|---|---|---|
| Algorithm | Setting | Max Retry count | Result |
| Decrease Retry delay by 250 ms | 3.75 | 0 | Retry Count Reduced to 0, Number of Exceptions 0 |

FIG. 9

INTELLIGENT REQUEST CONTROL FOR REST SERVICE

FIELD

The field relates generally to information processing systems, and more particularly to techniques for intelligent service request control in such information processing systems.

BACKGROUND

Representational state transfer (REST) is a software architectural style that defines a set of constraints to be used for creating microservices (e.g., web services). A microservice describes a programming technique that arranges one or more computer programs (e.g., one or more applications) as a collection of coupled services. Microservices that conform to REST provide interoperability between computing devices within an information processing system. For example, microservices utilize one or more REST application programming interfaces (APIs). A REST API is a set of rules that allow computing devices, and therefore microservices running on the computing devices, to communicate with each other.

When a first computing device (or microservice) attempts to communicate with a second computing device (or microservice) using a REST API, a failure in the API service call (request) is a common issue. The issue is then exacerbated by retry mechanisms used by the first computing device to resend the failed service request that results in further congestion in the information processing system which can adversely affect critical operations. Currently, attempts to minimize such congestion typically involve keeping a static or constant delay (time period) between the retries. Unfortunately, a client (e.g., computing device making a service request) that is unsuccessful with the service call may perform multiple (e.g., 4, 5 or greater) retries and wait the maximum constant delay time period between each retry. Some techniques attempt to set a maximum retry count according to an error code received. However, such an approach is also static over the vast number of possible error codes and not practical and adversely affects overall performance of the system due to resource clogging issues.

SUMMARY

Embodiments of the invention provide techniques for intelligent service request control in an information processing system.

For example, in one illustrative embodiment, a method comprises the following steps. In response to a failure of a request sent to a given service, data relating to one or more previous requests sent to the given service is analyzed. A recovery recommendation is generated based on the analyzing step and one or more factors, the recovery recommendation comprising a retry methodology to resend the request to the given service.

In additional illustrative embodiments, the one or more factors comprise at least one of a time of the failure of the request; a type of the failure of the request, a criticality of the service, and a resource usage associated with the service. When the service is a time-out type service, the retry methodology is configured to selectively operate in a fast fail optimized mode or a non-fast fail optimized mode. For example, when the given service is a non-critical service, the retry methodology is configured to operate in the fast fail optimized mode, and when the given service is a critical service, the retry methodology is configured to operate in the non-fast fail optimized mode. Further, when the service is a batch type service, the retry methodology is configured to operate in a batch optimized mode. Data relating to one or more previous requests sent to the given service used in the analysis further comprises data indicative of one or more patterns of success or failure associated with the one or more previous requests sent to the given service. Advantageously, the given service may be, but is not limited to, a REST API service.

These and other features and advantages of the invention will become more readily apparent from the accompanying drawings and the following detailed description.

DESCRIPTION

Illustrative embodiments may be described herein with reference to exemplary information processing systems such as, but not limited to, computing environments, cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "information processing system," "cloud environment," "cloud computing platform," "cloud infrastructure," "data repository," "data center," "data processing system," "computing system," "data storage system," "computing environment," and the like as used herein are intended to be broadly construed, so as to encompass, for example, any arrangement of one or more processing devices.

As mentioned in the background section above, existing API call retry mechanisms use a static or constant delay time period between retries, and may retry the API service call multiple times, i.e., up to a predetermined maximum retry count for a predetermined error code. However, as also mentioned, such an approach adversely affects overall performance of the system.

Figure 1:
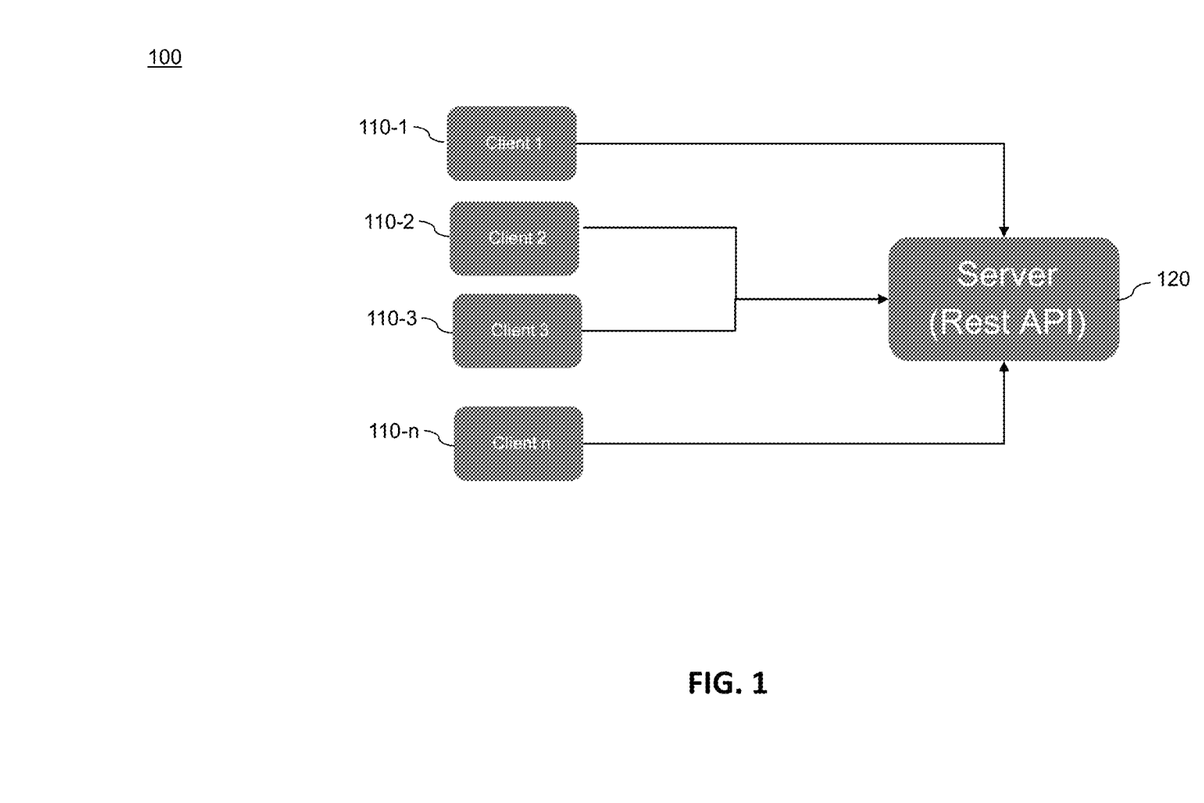
FIG. 1 depicts an information processing system with existing service request control.

FIG. 1 depicts an information processing system 100 with existing service request control. As shown, a plurality of computing devices 110-1 through 110-n (Client 1 through Client n) are operatively coupled to a server 120 that hosts or otherwise manages a REST API. Each client is configured to send an API service request (call) to the server 120. Assuming the REST API at server 120 is experiencing a failure or, for some other reason(s), service requests from computing devices 110-1 through 110-n are failing, each of computing devices 110-1 through 110-n can perform multiple retries within a relatively short time period depending on the retry mechanisms that each of them employ. Thus, assuming each of computing devices 110-1 through 110-n perform five retries over the given time period, the server receives 5×n extra service calls thereby likely causing performance issues at the server and otherwise causing congestion in the communication network coupling computing devices 110-1 through 110-n and server 120.

One approach to attempt to overcome these issues is to increase (e.g., double) the retry delay (i.e., time period between each retry). However, system 100 has no ability to determine exactly how much to increase the delay. And in some instances, once the first failure occurs, the next try itself will pass. In this instance, system 100 could reduce the retry time, but again, by how much.

Illustrative embodiments overcome the above and other drawbacks associated with existing service call retry mechanisms. For example, in one illustrative embodiment, a system and methodology enable a computing device (e.g., client) to call a REST API (make a service request or call) by understanding the behavior of the REST API (e.g., rather than based on error type, static retry, and/or max retry count) and to automatically derive an intelligent recovery method (i.e., retry method) upon a service call failure that reduces or eliminates (improves or optimizes) network congestion and other system performance issues. More particularly, one or more illustrative embodiments learn the behavior of the REST API's failure and mode of failure and adjust the retry delay and count based on the nature of the REST API and resource availability.

Figure 2:
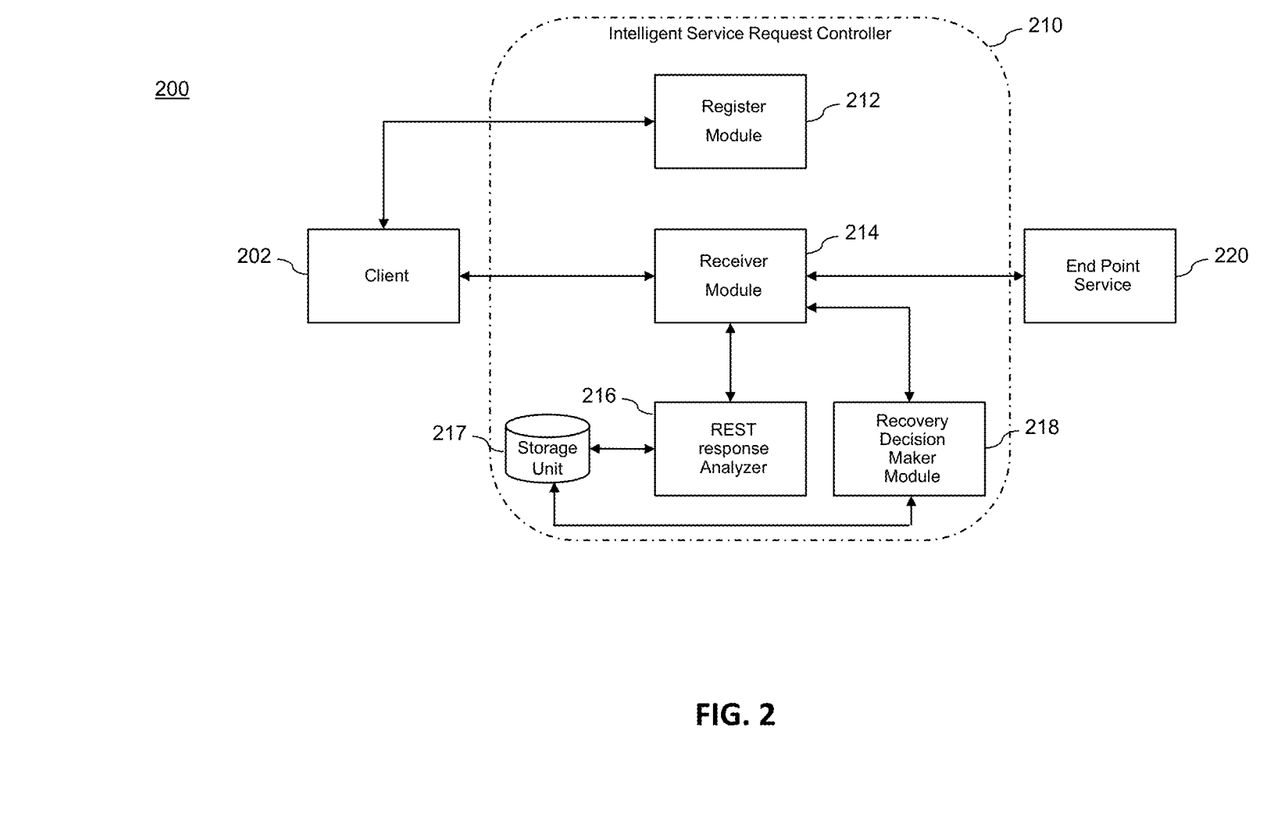
FIG. 2 depicts an information processing system with intelligent service request control, according to an illustrative embodiment.

FIG. 2 depicts an information processing system 200 with intelligent service request control, according to an illustrative embodiment. As shown, client 202 is operatively coupled to intelligent service request controller 210 which is operatively coupled to end point service 220. It is to be appreciated that, in one or more illustrative embodiments, client 202 and intelligent service request controller 210 can collectively reside in each of (or a subset of) computing devices 110-1 through 110-n, while end point service 220 can represent REST API server 120. Alternatively, end point service 220 can reside in a computing device such as or similar to computing devices 110-1 through 110-n.

Intelligent service request controller 210 is configured to learn the behavior of the REST API's failure and mode of failure and adjust the retry delay and count based on the nature of the REST API and resource availability. Accordingly, as shown, intelligent service request controller 210 comprises a register module 212, a receiver module 214, a REST response analyzer 216, a REST response analyzer storage unit 218, and a recovery decision maker module 218. Each component of intelligent service request controller 210 will now be described in further detail.

Register module 212 is configured to enable client 202 to register with the end point service 220 and distinguish between a timeout service (e.g., web page) or a batch service (e.g., can take time). For example, a timeout service is a service that has a specified time deadline for requests (and thus requests are sent as they arrive), while a batch service is a service that does not have such a time deadline (but rather requests are held together until a predetermined number of requests is reached and then the requests are submitted in a batch).

Client 202 calls receiver module 214 and passes an end point uniform resource locator (URL) to be called (i.e., the URL that corresponds to end point service 220). The receiver module 214 calls the end point URL. Depending on the result of the call, receiver module 214 passes the result ("first pass" as "P," "fail" as "1," "retry pass" as "2," "retry exceptions" as "3" and "retry failure" as "0") to the REST response analyzer 216. The term "pass" means "success" or "succeeds." Note that REST response analyzer 216 stores, in storage unit 217, the result of the response by time and analyzes the pattern of success and failure. This analysis utilizes server recourse information by time such as memory usage and CPU usage. If the result is a service call failure (i.e., "fail" or "1") then receiver module 214 calls recovery decision maker module 218 for guidance. Recovery decision maker module 218 analyzes data stored in storage unit 217 for the last predetermined time period (e.g., 5 days) and gives an intelligent recovery recommendation to the receiver module 214 as to what to do given the service call failure.

In illustrative embodiments, one or more factors can be used by recovery decision maker module 218 to make the intelligent recovery recommendation. Taking one or more of these factors into account improves or optimizes the failure recovery process and thus, for example, system performance. Factors used by recovery decision maker module 218 to make the intelligent recovery recommendation include, but are not limited to, one or more of:

(i) Time of failure. For example, it could be that the end point service 220 is receiving concurrent hits at the time of failure which could be likely cause of the failure. A recovery recommendation may be to retry at a time after the concurrent hits cease.

(ii) Transient or permanent failure (e.g., is cause of failure temporary in nature such as a transient network condition that clears itself or is it permanent in nature such as a server hardware failure?). That is, transient failures are typically recoverable (i.e., in real-time relative to typical operations of the system). In recovery time for a transient failure, some requests will pass with the next retry, some requests will pass after 5 retries, or some requests will pass after 20 retries). However, with a permanent failure, no number of retries will succeed until the cause of the permanent failure is fixed (which can take hours, days, etc.). Recovery recommendation can take this into account.

(iii) Criticality of service. If the service is considered critical, the recovery recommendation may be to attempt the maximum number of retries to pass. However, if the service is not critical, then the recovery recommendation may be to minimize the number of retries so that this will not affect critical services. For example, assume that two services are being called by client 202: (i) a financial relief service (critical); and (ii) a service that exports two years of data in an Excel spreadsheet (not critical). Thus, the recovery recommendation for the financial relief service would be to keep retrying up to a maximum retry number, while for the data export service it would be to not retry or keep reties to a minimum (so as not to congest the network and/or use up resources that could go to use by the critical service).

(iv) CPU usage and memory usage. For example, if a service call failed at the time of high memory usage or high CPU usage, the recovery recommendation may be to retry after a given period of time determined by historical data indicating how long peak times of usage last.

(v) Type of failure. Failure types such as, but not limited to, "database issue," "internal error," "business exceptions," "out of memory," "network issue" can have an impact on what recovery recommendation that recovery decision maker module 218 generates.

Figure 3:
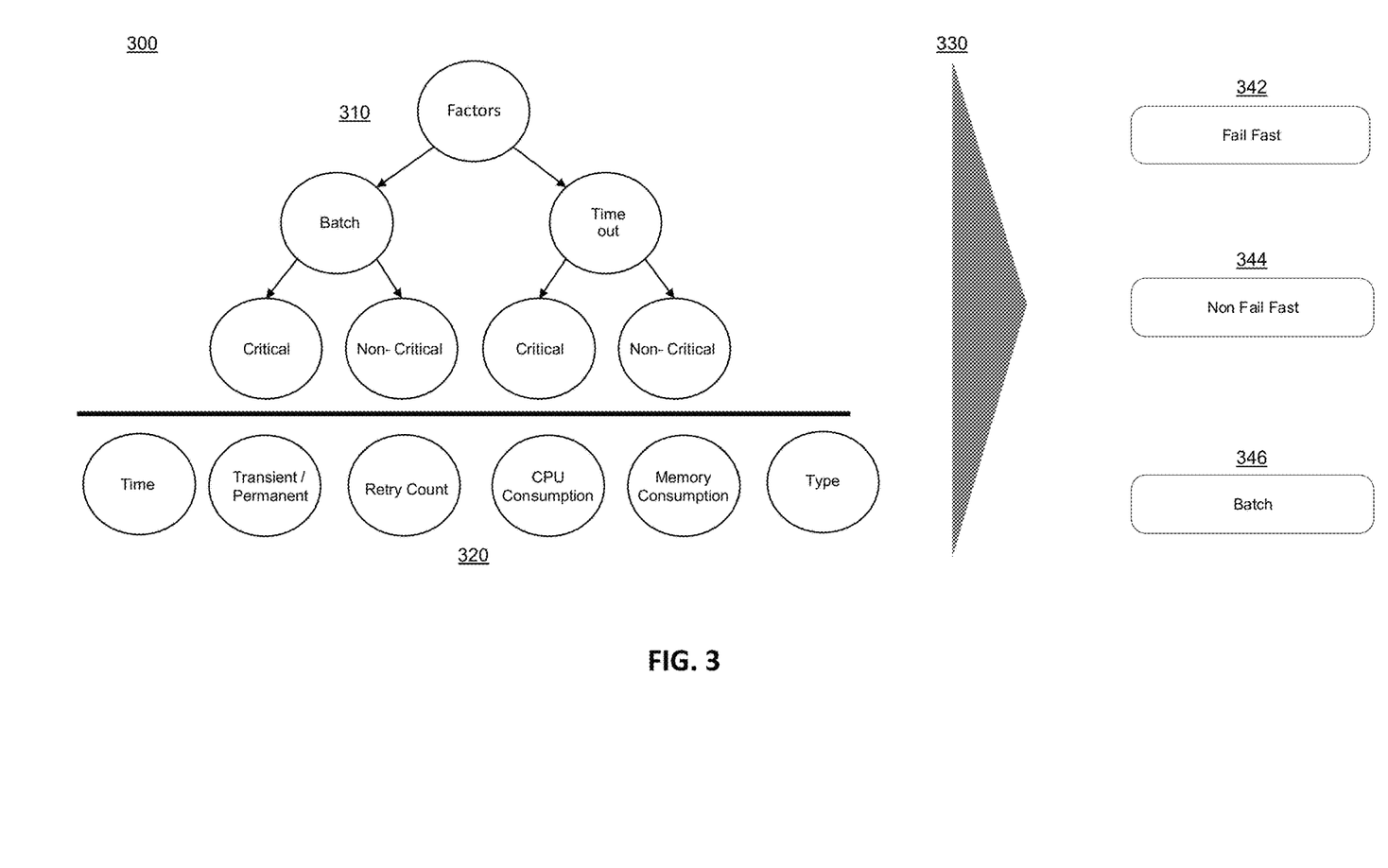
FIG. 3 depicts a methodology for intelligent service request control, according to an illustrative embodiment.

FIG. 3 depicts a methodology 300 used by recovery decision maker module 218 to generate an intelligent recovery recommendation. Factors 310 include factors (i) through (v) described above. However, it is to be understood that other factors can be considered by recovery decision maker module 218 in generating the intelligent recovery recommendation. Recovery decision maker module 218 utilizes one of more of factors 310 to determine in step 330 which recovery recommendation to implement, i.e., to perform intelligent service request control (e.g., make a recovery recommendation decision). In illustrative embodiments, intelligent service request control comprises a "fail fast" methodology 342 (described in further detail below in the context of FIG. 4), a "non-fail fast" methodology 344 (described in further detail below in the context of FIG. 5), and a "batch" methodology 346 (described in further detail below in the context of FIG. 6).

Figure 4:
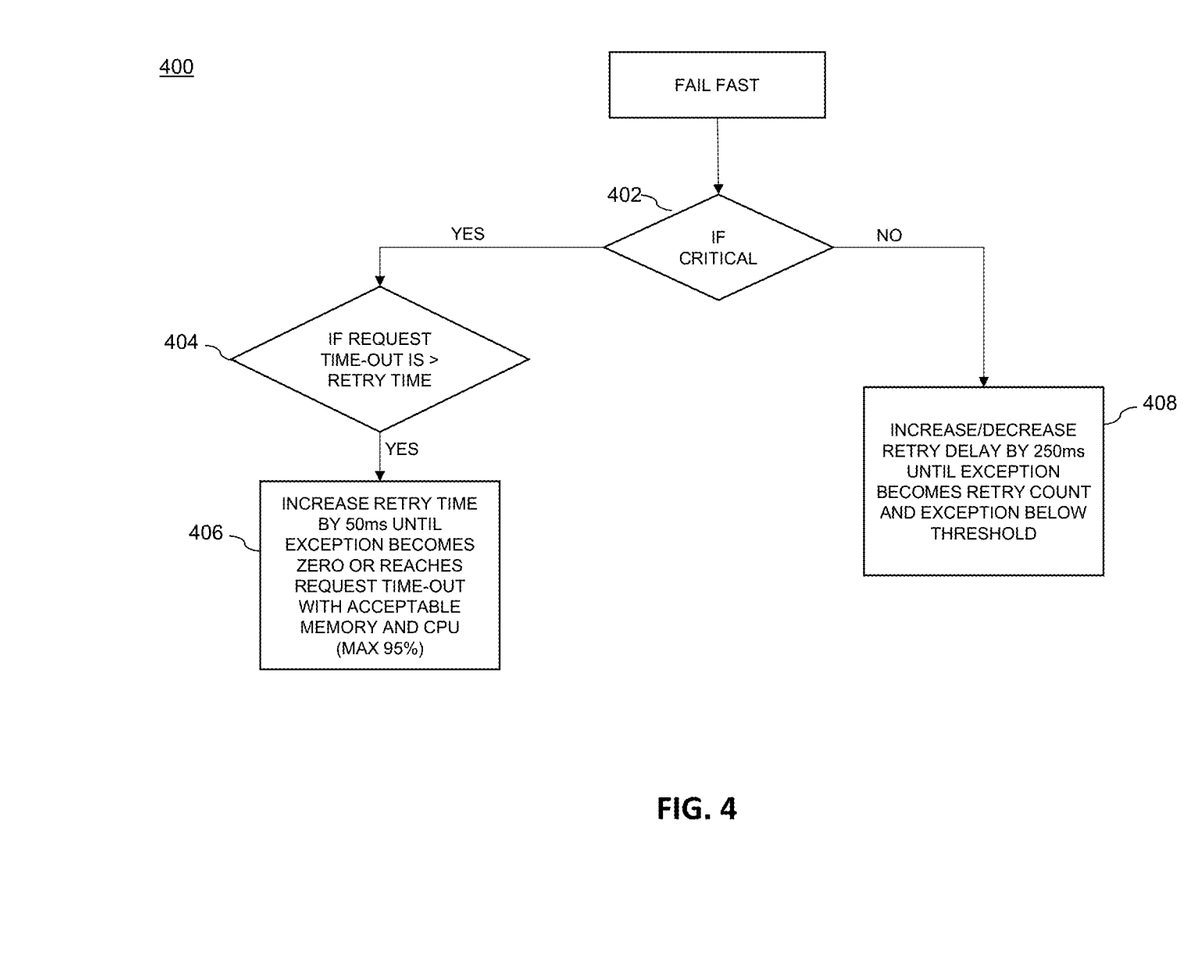
FIG. 4 depicts additional details of a methodology for intelligent service request control, according to an illustrative embodiment.

FIG. 4 depicts an exemplary flow 400 for fail fast methodology 342 shown in FIG. 3. As shown, step 402 determines whether or not the service is critical (see example above). If yes, then step 404 decides if a request time-out is greater than a retry time. Note that "request time-out" as illustratively used herein refers to a time deadline after which the request is no longer valid, and a new request has to be generated by the client. Systems will typically set a time-out for a request for REST service. If the time for the execution is more than the set value, the request will get timed out and the system will raise a "request time-out exception." "Retry time" (also referred to as "retry delay") refers to the time period waited until the next retry, i.e., after what duration the system should retry the request in case of any failure. Illustrative embodiments will optimize this retry time. An "exception" as illustratively used herein refers to an error (failure) in the system due to which program execution cannot progress and the program raises the "exception" and gets out the execution. If yes in step 404, then step 406 increases the retry time by 50 milliseconds (ms) until exception count (the number of exceptions) becomes zero or reaches the request time-out with acceptable memory and CPU (e.g., maximum 95% of total memory and CPU capacity). If no in step 404, flow 400 goes no further. A main goal in this branch of flow 400 is not to have any exception even if the number of retries increases. Step 406 can be iterated to obtain an optimal value. Optimal value is the time that there is no exception raised, i.e., as the time between retries increases, the chance of clogging reduces, at a point (iteratively increasing by 50 ms) the exception will become zero. That is the optimal value. Returning to step 402, if said step is no (i.e., service is not critical), then step 408 increases/decreases the retry delay by 250 ms until exception count becomes retry count (number of retries attempted before stopping) and exception count is below a predetermined threshold. A main goal in this branch of flow 400 is to have a minimal exception count but not to clog resources and attain optimal retry delay. The optimal value can be reached with lesser iterations.

Figure 5:
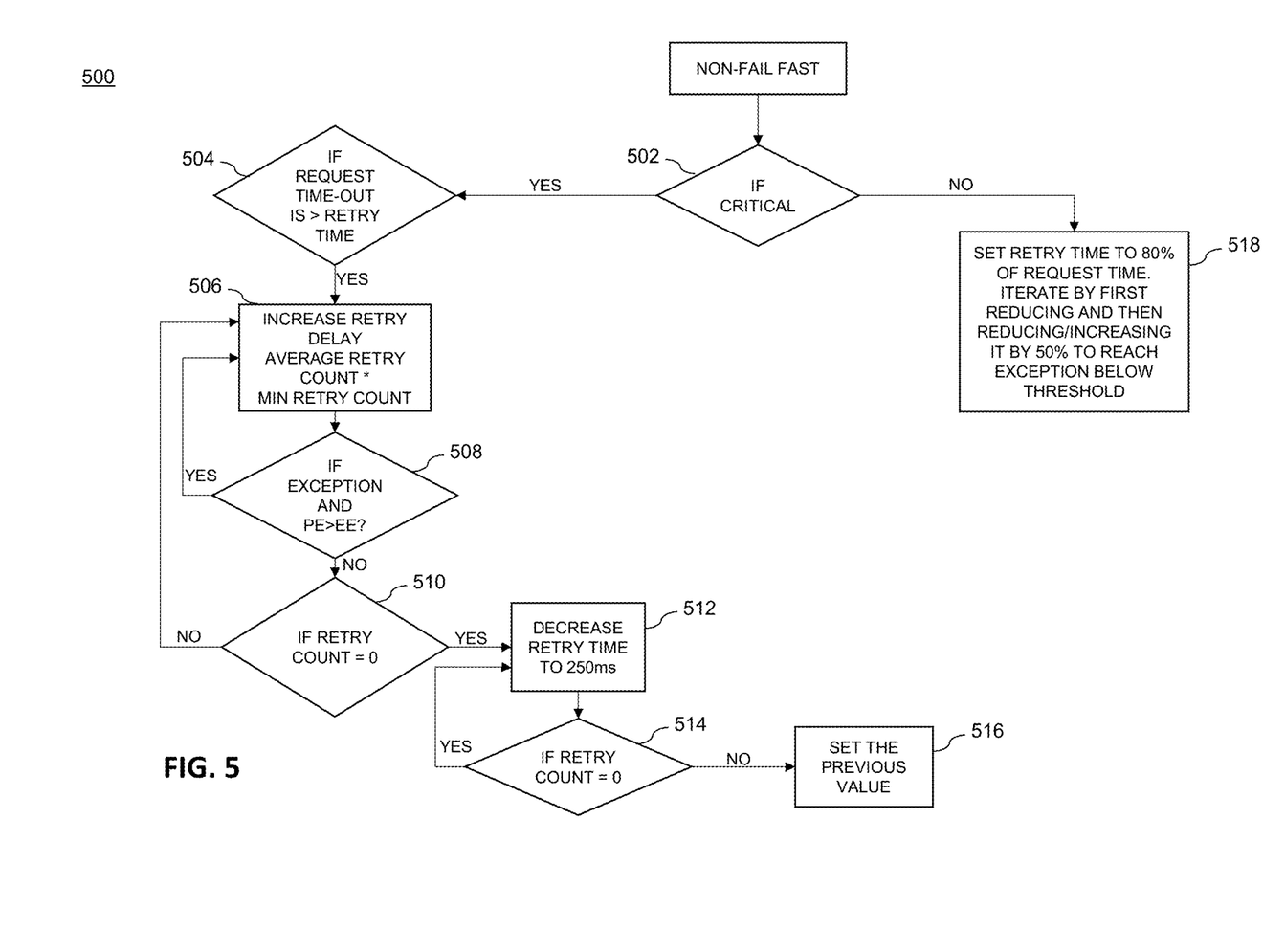
FIG. 5 depicts further details of a methodology for intelligent service request control, according to an illustrative embodiment.

FIG. 5 depicts an exemplary flow 500 for non-fail fast methodology 344 shown in FIG. 3. As shown, step 502 determines whether or not the service is critical (see example above). If yes, then step 504 decides if a request time-out is greater than the retry time. If no in step 504, flow 500 goes no further. If yes in step 504, then step 506 increases retry delay, average retry count*minimum retry count. In step 508, a determination is made whether exception count and PE are greater than EE. "Average retry" count is the number of retries the system needs to be performed. It is a trial process until the exception (failure) occurs. PE is the "potential exception" count (count of exceptions actually happening) and EE is the "excepted exception" count. A default case is that EE is set to zero; however, if a minimal number of exceptions is acceptable, e.g., one or two, EE can be set to that minimal number. If yes in step 508, then flow 500 returns to step 506. If no in step 508, then step 510 determines whether retry count is greater than zero. If step 510 is no, then flow 500 returns to step 506. If step 510 is yes, then step 512 decreases the retry time to 250 ms. Step 514 then rechecks whether retry count is greater than zero. If yes, then flow 500 returns to step 512; otherwise step 516 sets the previous value (value of the retry time before step 512). A main goal of this branch of flow 500 is to have an exception count of zero and a minimal retry count. Returning to step 502, if said step is no (i.e., service is not critical), then step 518 sets the retry time to be 80% of request time-out and iterates by first reducing and then reducing/increasing it by 50% to have the exception count be below the given threshold. A main goal in this branch of flow 400 is to have an exception count of zero with a large and optimal retry delay (less clogging of resources) and less iterations to reach the optimal value.

Figure 6:
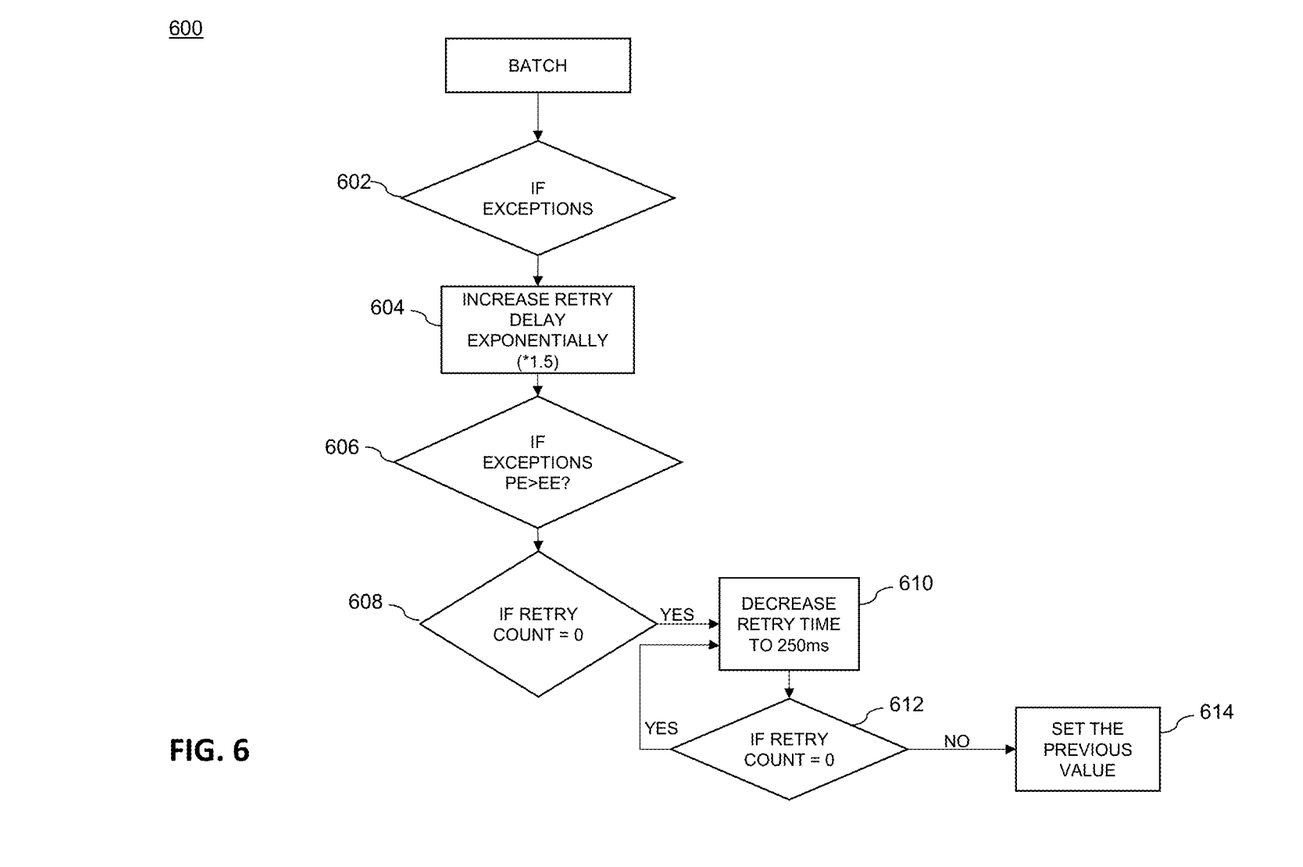
FIG. 6 depicts still further details of a methodology for intelligent service request control, according to an illustrative embodiment.

FIG. 6 depicts an exemplary flow 600 for batch methodology 346 shown in FIG. 3. As shown, step 602 determines whether or not there are exceptions. If yes in step 602, then then step 604 increases the retry delay exponentially (e.g., times 1.5). If no in step 602, flow 600 goes no further. In step 606, a determination is made whether an exception count and PE are greater than EE. If no, then step 608 determines whether retry count is greater than zero. If step 608 is yes, then step 610 decreases the retry time to 250 ms. Step 612 then rechecks whether retry count is greater than zero. If yes, then flow 600 returns to step 610; otherwise step 614 sets the previous value (value of the retry time before step 610). A main goal of flow 600 is to have an exception count of zero and a minimal retry count with a pessimistic delay. If the retry count is not reducing despite the optimization, the reason for the request failure is likely a permanent error (not an exception). Therefore, recovery decision maker module 218 can reset the retry count to zero and the flow will go to the exception block after the first failure. Once the permanent failure is fixed, recovery decision maker module 218 can then reset the optimization.

Figure 7:
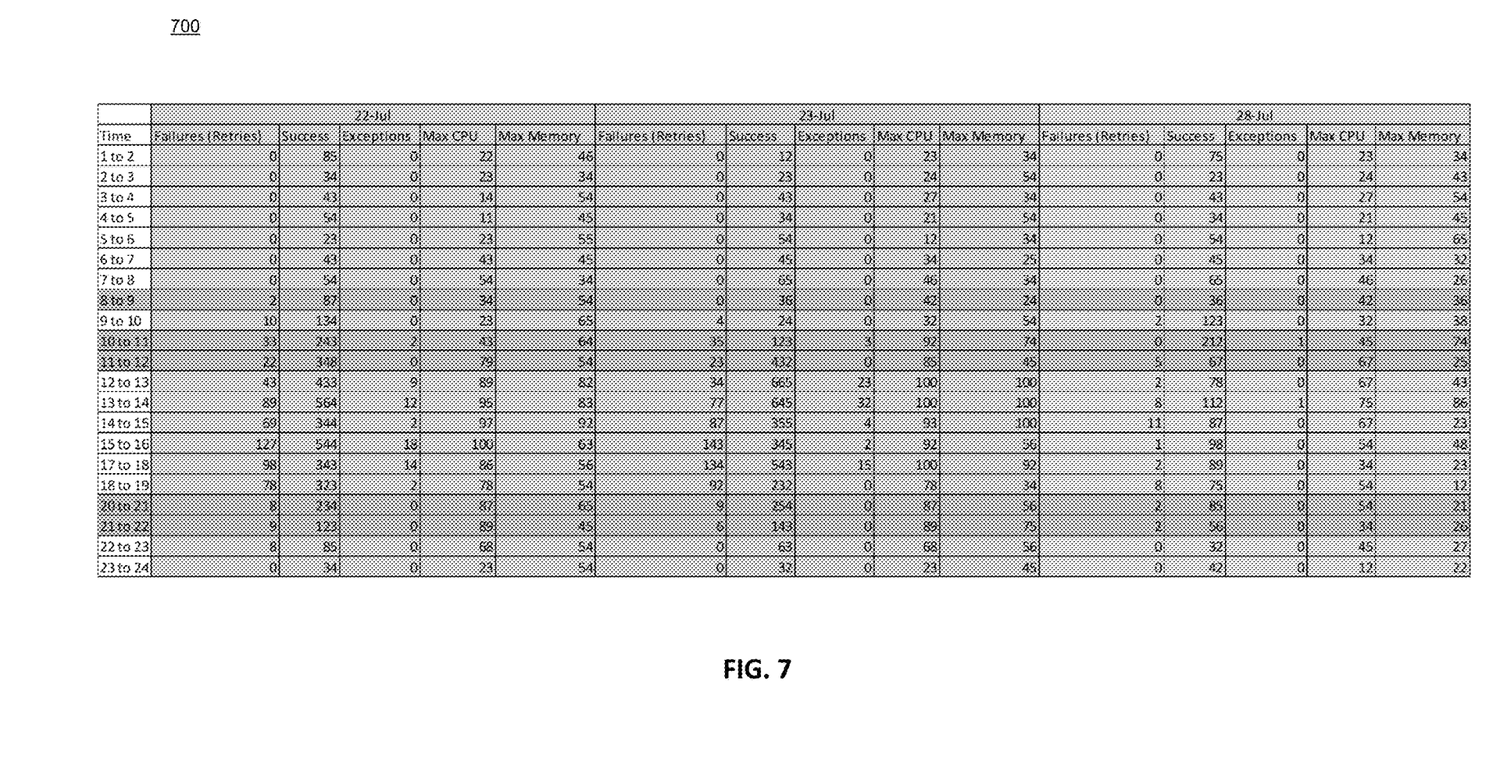
FIG. 7 depicts request success and failure data useable as part of a pattern analysis for a methodology for intelligent service request control, according to an illustrative embodiment.
Figure 8:
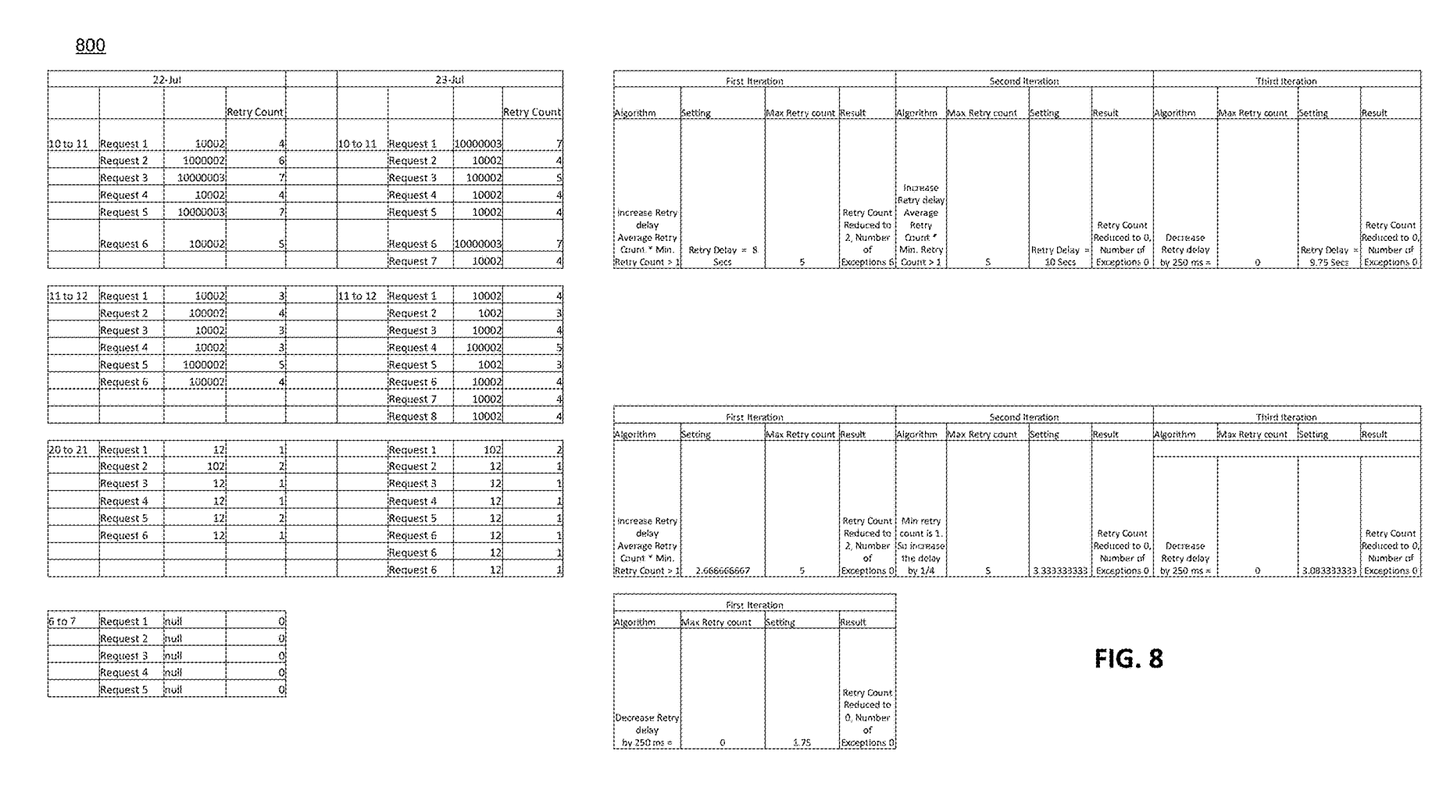
FIG. 8 depicts examples of intelligent request control results, according to an illustrative embodiment.

FIGS. 7 and 8 illustrate exemplary data corresponding to examples of the retry operations depicted in FIGS. 4 through 6. More particularly, FIG. 7 depicts data 700 useable as part of analysis and intelligent request control, according to an illustrative embodiment. Further, FIG. 8 depicts examples of intelligent request control results 800, according to an illustrative embodiment.

By way of example, assume Retry Static Delay=2 secs, Max Retry=7, Request Time out=10 secs (i.e., these are the initial settings). Without the solution proposed herein, the system would retry 7 times, with the delay of 2 secs. Then FIG. 7 shows data that collected July $22^{nd}$ and $23^{rd}$. Take 10 to 11 (10 AM to 11 AM), FIG. 7 shows that on July $22^{nd}$, 33 exceptions occurred, and on July 23$^{rd}$, 35 exceptions occurred. FIG. 8 shows that 6 requests came (maybe in parallel) within 10 to 11. Request 1 had 4 retries and passed. Here each time the request fails, it is mark as part of a failure number. First the failure mark is 1, then each failure mark is 0, once passed the mark is 2 (recall above). The notation 10002 means 4 times the retry failed, and on 5$^{th}$ retry the request passed. The notation 3 in this example means permanent failures, after which no retry will be done (recall that max retry is 7 times as set earlier), i.e., 1000003 means 7 times retried and then permanently failed.

Then, using the proposed solutions, from July 24$^{th}$ to 28$^{th}$, the system started calibrating and optimizing the retry count and retry delay by increasing the delay. FIG. 8 shows two iterations (25$^{th}$ and 26$^{th}$). In the second iteration, the exception came to zero, then the third iteration tried to optimize by reducing the retry delay. The average retry count in successful retry is 4, and the retry count is set to 3. Thus, the first iteration will set the retry delay as 4×2=8. Still, the system found 6 exceptions. Thus, the second iteration again increased by 2 secs. Here, the average retry count was 1, so the increase is 1×2=2, 8+2=10). After the second iteration, the exceptions reduced to 0.

But the system tries to reduce the time between 8 and 10. Thus, the system reduces the retry delay in the third iteration by 250 msec. Still, the system got 0 exceptions, and with this setting until July 28$^{th}$, the exception count is 0.

In a similar manner, other optimizations can be mapped. For 6 to 7, the exception is 0 in the initial state itself. But here the system will try to decrease the request delay time (which will increase the throughput, similar to the third iteration done by the system for the above scenario). The system will reduce delay from 2 to 1.75. Again, the system will try to make it 1.5, until it gets an error.

Accordingly, illustrative embodiments provide methodologies to enable a client to call a REST API by understanding the behavior of the REST API (rather than simply by error type, static retry, and maximum retry count) and automatically deriving an optimal way of recovery according the service before a "raise and break" condition is reached (e.g., after the maximum retry time, the system will stop retrying). Illustrative embodiments segregate service into time-out and batch types. In a time-out type, embodiments determine if this requires the fail fast mode or the non-fast fail mode. Embodiments analyze the pattern of the failure and retry, and set the optimal mode and manner of retry based on the pattern by hours dynamically rather than the error code.

Figure 9:
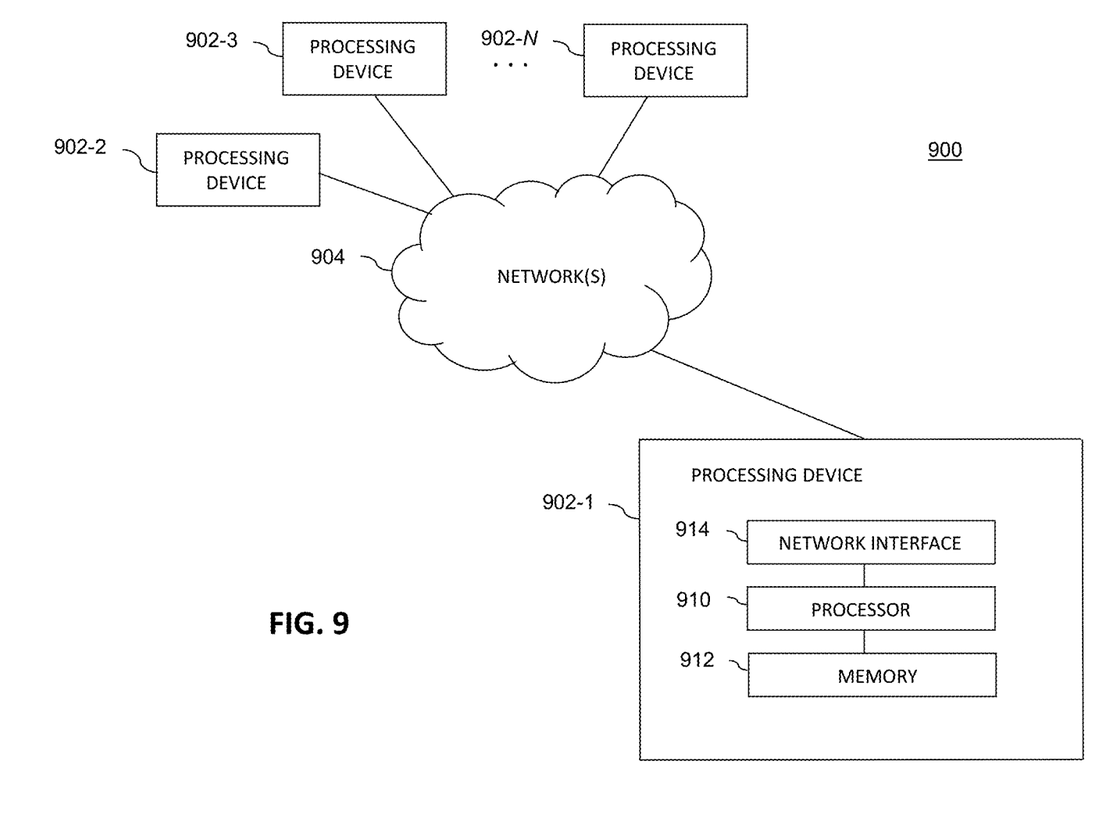
FIG. 9 depicts a processing platform used to implement intelligent request control, according to an illustrative embodiment.

FIG. 9 depicts a processing platform 900 used to implement intelligent request control, according to an illustrative embodiment. More particularly, processing platform 900 is a processing platform on which a computing environment with functionalities described herein (e.g., FIGS. 2-8 and otherwise described herein) can be implemented.

The processing platform 900 in this embodiment comprises a plurality of processing devices, denoted 902-1, 902-2, 902-3, . . . 902-N, which communicate with one another over network(s) 904. It is to be appreciated that the methodologies described herein may be executed in one such processing device 902, or executed in a distributed manner across two or more such processing devices 902. It is to be further appreciated that a server, a client device, a computing device or any other processing platform element may be viewed as an example of what is more generally referred to herein as a "processing device." As illustrated in FIG. 9, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 902 shown in FIG. 9. The network(s) 904 represent one or more communications networks that enable components to communicate and to transfer data therebetween, as well as to perform other functionalities described herein.

The processing device 902-1 in the processing platform 900 comprises a processor 910 coupled to a memory 912. The processor 910 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 910. Memory 912 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 912 may comprise electronic memory such as random-access memory (RAM), read-only memory (ROM) or other types of memory, in any combination. The one or more software programs when executed by a processing device such as the processing device 902-1 causes the device to perform functions associated with one or more of the components/steps of system/methodologies in FIGS. 1-7. One skilled in the art would be readily able to implement such software given the teachings provided herein. Other examples of processor-readable storage media embodying embodiments of the invention may include, for example, optical or magnetic disks.

Processing device 902-1 also includes network interface circuitry 914, which is used to interface the device with the networks 904 and other system components. Such circuitry may comprise conventional transceivers of a type well known in the art.

The other processing devices 902 (902-2, 902-3, . . . 902-N) of the processing platform 900 are assumed to be configured in a manner similar to that shown for computing device 902-1 in the figure.

The processing platform 900 shown in FIG. 9 may comprise additional known components such as batch processing systems, parallel processing systems, physical machines, virtual machines, virtual switches, storage volumes, etc. Again, the particular processing platform shown in this figure is presented by way of example only, and the system shown as 900 in FIG. 9 may include additional or alternative processing platforms, as well as numerous distinct processing platforms in any combination.

Also, numerous other arrangements of servers, clients, computers, storage devices or other components are possible in processing platform 900. Such components can communicate with other elements of the processing platform 900 over any type of network, such as a wide area network (WAN), a local area network (LAN), a satellite network, a telephone or cable network, or various portions or combinations of these and other types of networks.

Furthermore, it is to be appreciated that the processing platform 900 of FIG. 9 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 900 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-9 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A system, comprising:
    at least one processing device comprising a processor operatively coupled to a memory, wherein the at least one processing device is configured to:
    in response to a failure of a request sent to a given service, analyze data relating to one or more previous requests sent to the given service; and
    generate a recovery recommendation based on the analysis and one or more factors, the recovery recommendation comprising a retry methodology to resend the request to the given service.

2. The system of claim 1, wherein the one or more factors comprise at least one of a time of the failure of the request; a type of the failure of the request, a criticality of the service, and a resource usage associated with the service.

3. The system of claim 2, wherein when the given service is identified as one of a time-out type service and a batch type service.

4. The system of claim 3, wherein, when the service is a time-out type service, the retry methodology is configured to selectively operate in a fast fail optimized mode or a non-fast fail optimized mode.

5. The system of claim 4, wherein, when the given service is a non-critical service, the retry methodology is configured to operate in the fast fail optimized mode.

6. The system of claim 4, wherein, when the given service is a critical service, the retry methodology is configured to operate in the non-fast fail optimized mode.

7. The system of claim 3, wherein, when the service is a batch type service, the retry methodology is configured to operate in a batch optimized mode.

8. The system of claim 1, wherein the data relating to one or more previous requests sent to the given service used in the analysis further comprises data indicative of one or more patterns of success or failure associated with the one or more previous requests sent to the given service.

9. The system of claim 1, wherein the given service is a REST API service.

10. A method, comprising:
    in response to a failure of a request sent to a given service, analyzing data relating to one or more previous requests sent to the given service; and
    generating a recovery recommendation based on the analyzing step and one or more factors, the recovery recommendation comprising a retry methodology to resend the request to the given service;
    wherein the steps are performed by at least one processing device comprising a processor operatively coupled to a memory.

11. The method of claim 10, wherein the one or more factors comprise at least one of a time of the failure of the request; a type of the failure of the request, a criticality of the service, and a resource usage associated with the service.

12. The method of claim 11, wherein when the given service is identified as one of a time-out type service and a batch type service.

13. The method of claim 12, wherein, when the service is a time-out type service, the retry methodology is configured to selectively operate in a fast fail optimized mode or a non-fast fail optimized mode.

14. The method of claim 13, wherein, when the given service is a non-critical service, the retry methodology is configured to operate in the fast fail optimized mode.

15. The method of claim 13, wherein, when the given service is a critical service, the retry methodology is configured to operate in the non-fast fail optimized mode.

16. The method of claim 12, wherein, when the service is a batch type service, the retry methodology is configured to operate in a batch optimized mode.

17. The method of claim 10, wherein the data relating to one or more previous requests sent to the given service used in the analysis further comprises data indicative of one or more patterns of success or failure associated with the one or more previous requests sent to the given service.

18. The method of claim 10, wherein the given service is a REST API service.

19. An article of manufacture comprising a non-transitory processor-readable storage medium having stored therein program code of one or more software programs, wherein the program code when executed by at least one processing device causes said at least one processing device to perform steps of:
   in response to a failure of a request sent to a given service, analyzing data relating to one or more previous requests sent to the given service; and
   generating a recovery recommendation based on the analyzing step and one or more factors, the recovery recommendation comprising a retry methodology to resend the request to the given service.

20. The article of claim 19, wherein the one or more factors comprise at least one of a time of the failure of the request; a type of the failure of the request, a criticality of the service, and a resource usage associated with the service.

* * * * *